Patented Nov. 3, 1942

2,300,693

UNITED STATES PATENT OFFICE 2,300,693

PROCESS FOR DEWATERING SLUDGES

Harold F. Oswald, Elizabeth, N. J., assignor to Oliver United Filters Incorporated, San Francisco, Calif., a corporation of Nevada No Drawing. Application April 4, 1939, Serial No. 265,933

5 Claims. (Cl. 210—2)

This invention relates in general to a process for dehydrating sludges and more particularly to a process for rendering more filterable sludges from industrial wastes and particularly meat packing plant wastes containing fats, fatty acids, and animal proteins such as blood and albumin. Fats, fatty acids, blood, and albumin are all of a colloidal nature and because of this property materially decrease the rate of filtration of any sludges containing them.

In general the object of this invention is the provision of a method for treating packing house waste sludges so as to render some of their constituents more insoluble and therefore capable of being filtered on continuous filters.

More specifically, the object of my invention is the addition of reagents such as the soluble chloride and sulphate salts of magnesium, lithium, calcium, barium, iron, zinc, and ammonium to solutions containing colloidal substances of this character so as to convert the fats to insoluble soaps and to coagulate the blood and albumin content.

The sludges to which the treatment contemplated by this invention is particularly applicable are derived from wastes from the killing room, fancy meat department, tank house, and hide cellar of a meat packing house after such wastes have been freed of the greater portion of their grease content, treated with sulphuric acid and ferric sulphate, and then cooked at from 180° F. to 200° F. In cooking the sludge at this temperature some coagulation occurs and upon allowing the heated sludge to remain at this temperature without agitation for a period of thirty minutes a layer of relatively heavy sludge will form on the bottom and a layer of floating solids on top, with an intervening layer of water. This intervening layer of water is readily removed by decantation. The resulting sludges from wastes so treated have a pH value of from 5 to 6 and contain about 8% solids.

A sludge of this character can not be dehydrated on a continuous filter without further treatment, for apparently there is a sufficient quantity of colloidal matter present, such as fats, fatty acids, and animal proteins including blood and albumin, soon to plug or clog the filter medium to a point where the rate of filtration is no longer economical.

I have found, however, that these colloidal substances may be precipitated and/or coagulated and therefore rendered more filterable by the addition of a small quantity of calcium chloride or any of the soluble chloride and/or sulphate salts of magnesium, lithium, calcium, barium, iron, ammonium, or zinc. At least one pound of such reagent (calculated on a dry weight basis) should be added for every one hundred pounds of solids contained in the sludge, although it is immaterial how much more of the reagent is used, for apparently the excess is inert and has no harmful effects.

By resorting to an expedient such as this, the sludge may be filtered at an average rate of eight pounds (calculated on a dry weight basis) per square foot of filter area per hour, whereas without the use of such treatment the rate of filtration falls to less than half of that.

Since the sludges being dealt with consist largely of proteins, the chemistry of which is for the most part unknown, any explanation of the chemical reactions taking place upon the addition of the above reagents would be largely hypothetical. It may however be ventured that a large part of the protein content of the sludge is coagulated, and the fats, fatty acids, and soluble soaps are converted to insoluble soaps. More important than an explanation of the chemical reactions which take place is the fact that the addition of these reagents results in more than doubling the average rate of filtration formerly obtained, and therefore makes possible the use of a continuous filter.

I claim:

1. The method of dewatering a biological waste sludge containing colloidal matter, comprising: adding to such sludge a small quantity of a metallic salt selected from the group consisting of barium chloride, calcium chloride, magnesium chloride, zinc chloride, magnesium sulphate, and zinc sulphate, and then filtering the sludge so treated.

2. The method of dewatering a biological waste sludge containing colloidal matter, comprising: adding to such sludge not less than 1% by weight of a metallic salt selected from the group consisting of barium chloride, calcium chloride, magnesium chloride, zinc chloride, magnesium sulphate, and zinc sulphate, and then filtering the sludge so treated.

3. The method of rendering more filterable biological waste sludges containing colloidal matter, comprising: precipitating such matter by the addition of a small quantity of a coagulant selected from the group consisting of barium chloride, calcium chloride, magnesium chloride, zinc chloride, magnesium sulphate, and zinc sulphate.

4. The method of dewatering a biological waste sludge containing colloidal matter, comprising: adding to such sludge a small quantity of calcium chloride and then filtering the sludge so treated.

5. The method of dewatering a packing house sludge containing colloidal matter, comprising: adding to such sludge not less than 1% by weight of calcium chloride and then filtering the sludge so treated.

HAROLD F. OSWALD.